United States Patent
Senapati

(10) Patent No.: US 10,951,852 B1
(45) Date of Patent: Mar. 16, 2021

(54) METHOD AND SYSTEM FOR AUTOMATICALLY ADJUSTING DISPLAY PARAMETERS OF A DISPLAY SCREEN OF A TELEVISION DEVICE

(71) Applicant: Top Victory Investments Limited, Kowloon (HK)

(72) Inventor: Gyana Ranjan Senapati, Karnataka (IN)

(73) Assignee: Top Victory Investments Limited, Kowloon (HK)

(*) Notice: Subject to any disclaimer, the term of this patent is extended or adjusted under 35 U.S.C. 154(b) by 0 days.

(21) Appl. No.: 16/820,009

(22) Filed: Mar. 16, 2020

(30) Foreign Application Priority Data

Feb. 13, 2020 (EP) ..................................... 20157077

(51) Int. Cl.
*H04N 5/58* (2006.01)
*H04N 5/60* (2006.01)

(52) U.S. Cl.
CPC ................. *H04N 5/58* (2013.01); *H04N 5/60* (2013.01)

(58) Field of Classification Search
CPC ............... H04N 5/58; H04N 5/60; H04N 5/57
See application file for complete search history.

(56) References Cited

U.S. PATENT DOCUMENTS

| | | | |
|---|---|---|---|
| 7,071,456 B2 | 7/2006 | Poplin | |
| 2002/0199193 A1* | 12/2002 | Gogoi | H04N 21/466 725/46 |
| 2004/0015983 A1* | 1/2004 | Lemmons | H04N 21/4131 725/12 |
| 2008/0092156 A1* | 4/2008 | Ferrone | H04N 21/44218 725/13 |
| 2008/0316372 A1 | 12/2008 | Xu | |
| 2010/0271390 A1 | 10/2010 | Tran | |
| 2012/0019493 A1* | 1/2012 | Barnhoefer | H05B 41/3922 345/207 |
| 2015/0145883 A1* | 5/2015 | Marti | G06T 11/001 345/592 |
| 2017/0090584 A1* | 3/2017 | Tang | G06F 3/165 |
| 2017/0256040 A1* | 9/2017 | Grauer | H04N 1/32144 |
| 2017/0264851 A1 | 9/2017 | Kuplevakhsky | |
| 2018/0139434 A1 | 5/2018 | Roe et al. | |
| 2019/0327526 A1 | 10/2019 | Navin et al. | |

OTHER PUBLICATIONS

Search Report issued to European counterpart application No. 20157077.7 by the EPO dated Jul. 1, 2020.

\* cited by examiner

*Primary Examiner* — Michael E Teitelbaum
(74) *Attorney, Agent, or Firm* — MLO, a professional corp.

(57) ABSTRACT

A method for automatically adjusting display parameters of a display screen of a television device includes: in receipt of an activation signal, controlling the display screen to output a video signal based on a set of display parameters, and controlling the depth camera to capture images of a viewing area; determining a set of condition parameters based on the images; determining, based on the set of condition parameters, whether the video signal is to be adjusted; and when it is determined that the video signal is to be adjusted, adjusting at least one display parameter in the set of display parameters to generate an adjusted video signal and controlling the display screen to output the adjusted video signal.

10 Claims, 3 Drawing Sheets

METHOD AND SYSTEM FOR AUTOMATICALLY ADJUSTING DISPLAY PARAMETERS OF A DISPLAY SCREEN OF A TELEVISION DEVICE

CROSS-REFERENCE TO RELATED APPLICATION

This application claims priority of European Patent Application No. 20157077.7, filed on Feb. 13, 2020.

FIELD

The disclosure relates to a method and a system for automatically adjusting display parameters of a display screen of a television device.

BACKGROUND

Typically, when a user is watching a program or playing a video game on a television device for an extended period, the user may experience asthenopia symptoms such as fatigue, pain, blurred vision, headache, etc.

SUMMARY

One object of the disclosure is to provide a method for automatically adjusting display parameters of a display screen of a television device.

According to one embodiment of the disclosure, the method is for automatically adjusting display parameters of a display screen of a television device. The television device further includes a processor that communicates with a depth camera, the method being implemented using the processor of the television device and characterized by steps of:

in receipt of an activation signal, controlling the display screen to output a video signal based on a set of display parameters;

controlling the depth camera to continuously capture images of a viewing area in front of the display screen;

determining a set of condition parameters based at least on the images;

determining, based on at least one condition parameter in the set of condition parameters, whether the video signal is to be adjusted; and when it is determined that the video signal is to be adjusted, adjusting at least one display parameter in the set of display parameters to generate an adjusted video signal and controlling the display screen to output the adjusted video signal.

Another object of the disclosure is to provide a television system that is configured to implement the above-mentioned method.

According to one embodiment of the disclosure, the television system is connected to a depth camera and includes a processor and a display screen. The processor is configured to:

in receipt of an activation signal, control the display screen to output a video signal based on a set of display parameters, and control the depth camera to continuously capture images of a viewing area in front of said display screen;

determine a set of condition parameters by performing, for each of the images captured by the depth camera, an image processing operation;

determine, based on at least one of the condition parameters, whether the video signal is to be adjusted; and when it is determined that the video signal is to be adjusted, adjust at least one display parameter in the set of display parameters and control the display screen to output the video signal based on an adjusted set of display parameters that includes said at least one display parameter that has been adjusted.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
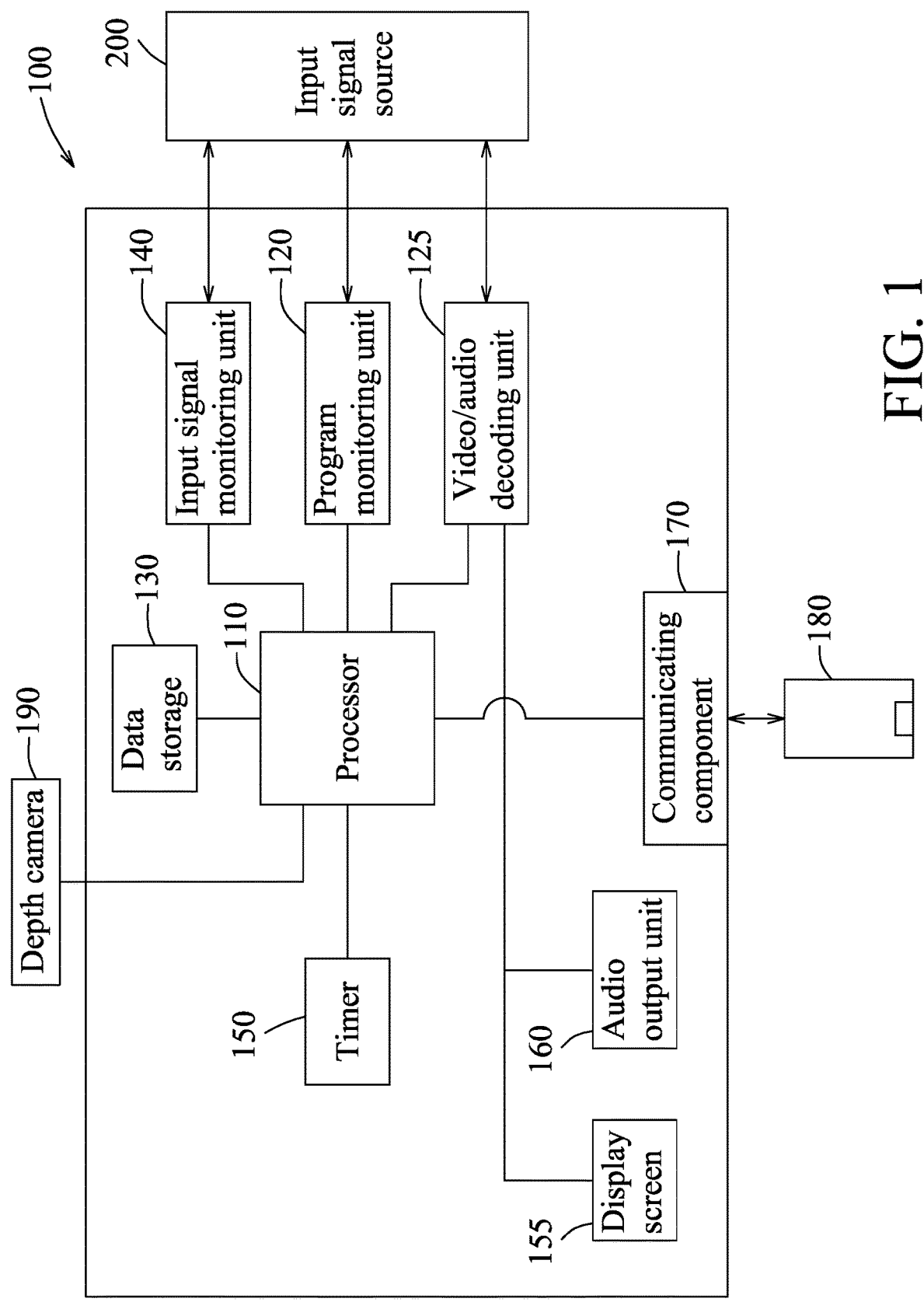
FIG. 1 is a block diagram illustrating a television system that includes a television device according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 illustrates a television system that includes a television device 100 according to one embodiment of the disclosure. In this embodiment, the television device 100 includes a processor 110, a program monitoring unit 120, a video/audio decoding unit 125, a data storage 130, a timer 150, a display screen 155, an audio output unit 160 and a communicating component 170. The television system further includes a depth camera 190 that is mounted on the television device 100 (see FIG. 2).

The processor 110 may include, but not limited to, a single core processor, a multi-core processor, a microprocessor, a microcontroller, a digital signal processor (DSP), a field-programmable gate array (FPGA), an application specific integrated circuit (ASIC), a radio-frequency integrated circuit (RFIC), and/or the like.

The program monitoring unit 120 is electrically connected to the processor 110 and an input signal source 200. The input signal source 200 is, for example, a set-top box providing a source signal that may be one of an over-the-air (OTA) television signal, a satellite television signal, a cable television signal, a media on demand (MOD) signal, a digital streaming signal, etc. The source signal may be in the form of an analog signal or a digital signal, and may include an electronic program guide (EPG) containing program metadata regarding a program.

In some embodiments, the input signal source 200 is a built-in hard disk drive (HDD) or an external storage that is connected to the television device 100 via a data interface (e.g., a Universal Serial Bus (USB) interface, a high definition multimedia interface (HDMI), etc.). In such embodiments, the input signal source 200 provides the source signal in a form of a media file (e.g., a pre-recorded program) stored therein which a viewer has selected for playback.

In some embodiments, the input signal source 200 is an externally connected electronic device (e.g., a gaming console), and the source signal may be obtained from the externally connected electronic device, and the source signal displayed by the display screen 155 may be adjusted based on a user input command. The user input command may be inputted by the user using a controller connected with the externally connected electronic device.

The video/audio decoding unit 125 may be embodied using a coder-decoder (codec) circuit, and is electrically connected to the processor 110 and the input signal source 200. The video/audio decoding unit 125 is configured to receive the source signal from the input signal source 200, and is controlled by the processor 110 to perform a decoding operation on the source signal so as to obtain a video signal and an audio signal from the source signal.

The data storage 130 may be embodied using one or more of a hard disk, a solid-state drive (SSD) and other non-transitory storage medium, and stores at least one user profile and a set of software applications therein. The set of software applications may include an operating system (OS) to be executed by the processor 110.

The display screen 155 and the audio output unit 160 are electrically connected to the processor 110 and the video/audio decoding unit 125, and are controlled by the processor 110 to display the video signal and output the audio signal, respectively. For example, the audio output unit 160 is a speaker built in the television device 100. In some embodiments, the audio output unit 160 may be wirelessly connected to the processor 110 using a wireless communication mechanism such as Wi-Fi, Bluetooth®, etc.

The audio output unit 160 is controlled to output the audio signal based on a current output setting which may be adjusted manually. The current output setting includes at least a volume setting that is related to an output volume. In some cases, the television device 100 may be provided with more advanced sound control, including a sound equalizer (which may be embodied using physical circuitry or software programs constituting filters) for adjusting energy levels of components of the audio signal at different frequency bands.

The communicating component 170 is electrically connected to the processor 110, and may include a short-range wireless communication module supporting a short-range wireless communication network using a wireless technology of Bluetooth® and/or Wi-Fi, etc., and a mobile communication module supporting telecommunication using Long-Term Evolution (LTE), the third generation (3G) and/or fourth generation (4G) of wireless mobile telecommunications technology, and/or the like.

The depth camera 190 is disposed directly on top of the television device 100 (see FIG. 2) or at a place in the proximity of the television device 100, and is configured to capture images of a viewing area in front of the display screen 155.

In the disclosure, the term "viewing area" is defined as an area in front of the display screen 155, and a user is able to view content displayed by the display screen 155 when the user is in the viewing area. In one embodiment, the viewing area is defined by a viewing angle of the television device 100.

The processor 110 is capable of determining whether there is a user in the image of the viewing area, and estimating a depth of the user (i.e., a distance between the user and the television device 100). In this embodiment, the depth camera 190 further includes a light intensity sensor (not depicted in the drawings) for estimating an ambient light intensity (also known as lighting) over the viewing area. It is noted that the lighting over the viewing area may be provided by natural light (e.g., sunlight in daytime) or an artificial light source.

Figure 2:
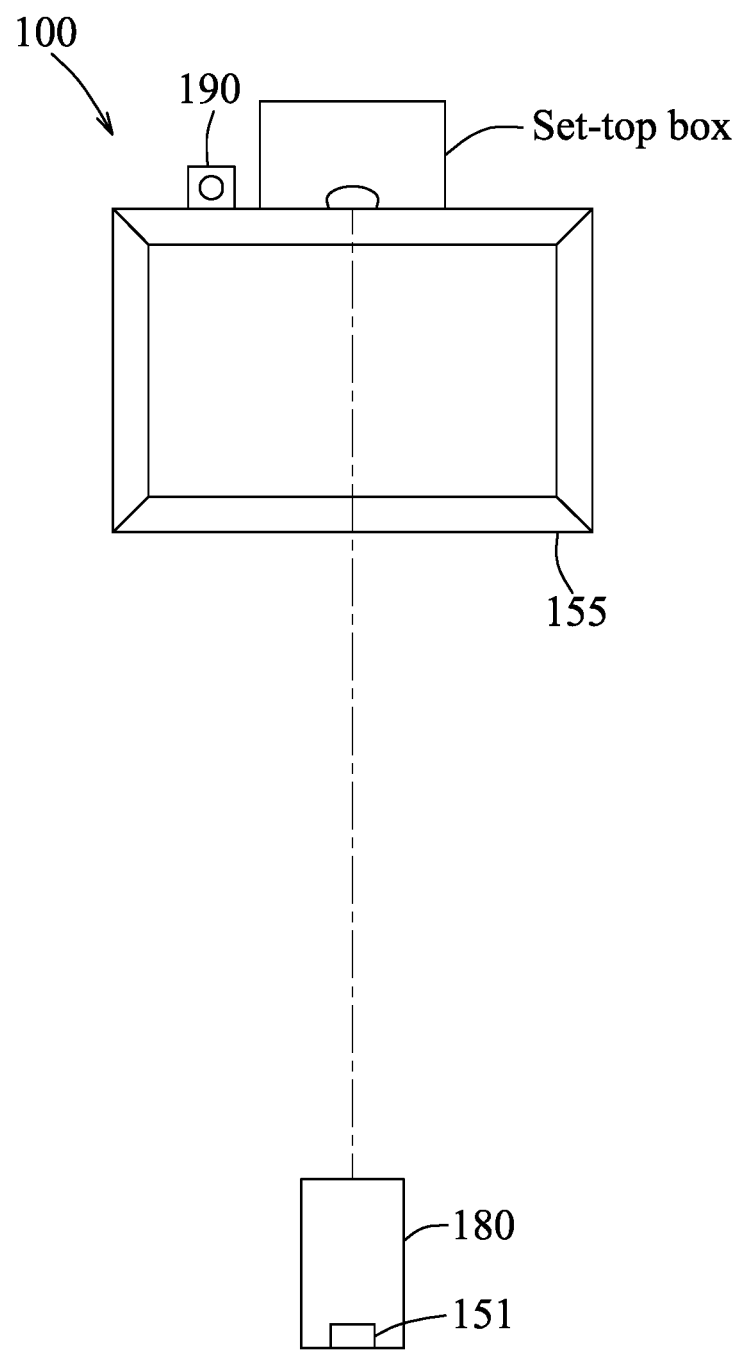
FIG. 2 is a schematic diagram illustrating the television system.

With further reference to FIG. 2, in this embodiment, the communicating component 170 is in communication with a remote control 180 for receiving a control signal therefrom. The control signal is for triggering the television device 100 to switch to an intended channel, to output the audio signal with an intended output volume, or to change one of a plurality of setting options of the television device 100. Additionally, the television device 100 may include a control panel disposed on an outer case of the television device 100. The control panel includes one or more buttons that enable the user to operate the television device 100 to switch to an intended channel, to output the audio signal with an intended output volume, or to change one of the setting options (e.g., one or more of display settings or other preferences). In this embodiment, the setting options include a set of display parameters associated with how the display screen 155 is controlled to display the video signal. The set of display parameters includes one or more of contrast, red, green and blue (RGB) setting, luminance, brightness, sharpness and color temperature of the display screen 155. Each of the display parameters may be represented using one or more numeral value(s).

In the embodiment where the source signal from the input signal source 200 is a digital stream signal or other signals from the Internet, the set of display parameters may further include resolution of the digital stream signal (e.g., 240p, 288p, 480p, 720p, 1080p, 2160p, 4320p, etc.).

It is noted that in some embodiments, some components of the television device 100 (such as the program monitoring unit 120, the video/audio decoding unit 125, etc.) may be embodied using, for example, microprocessors that execute software instructions, firmware, etc.

In some embodiments, some components of the television device 100 (such as the processor 110, the program monitoring unit 120, the video/audio decoding unit 125, the data storage 130, and the communicating component 170) may be integrated into a set-top box (STB).

Figure 3:
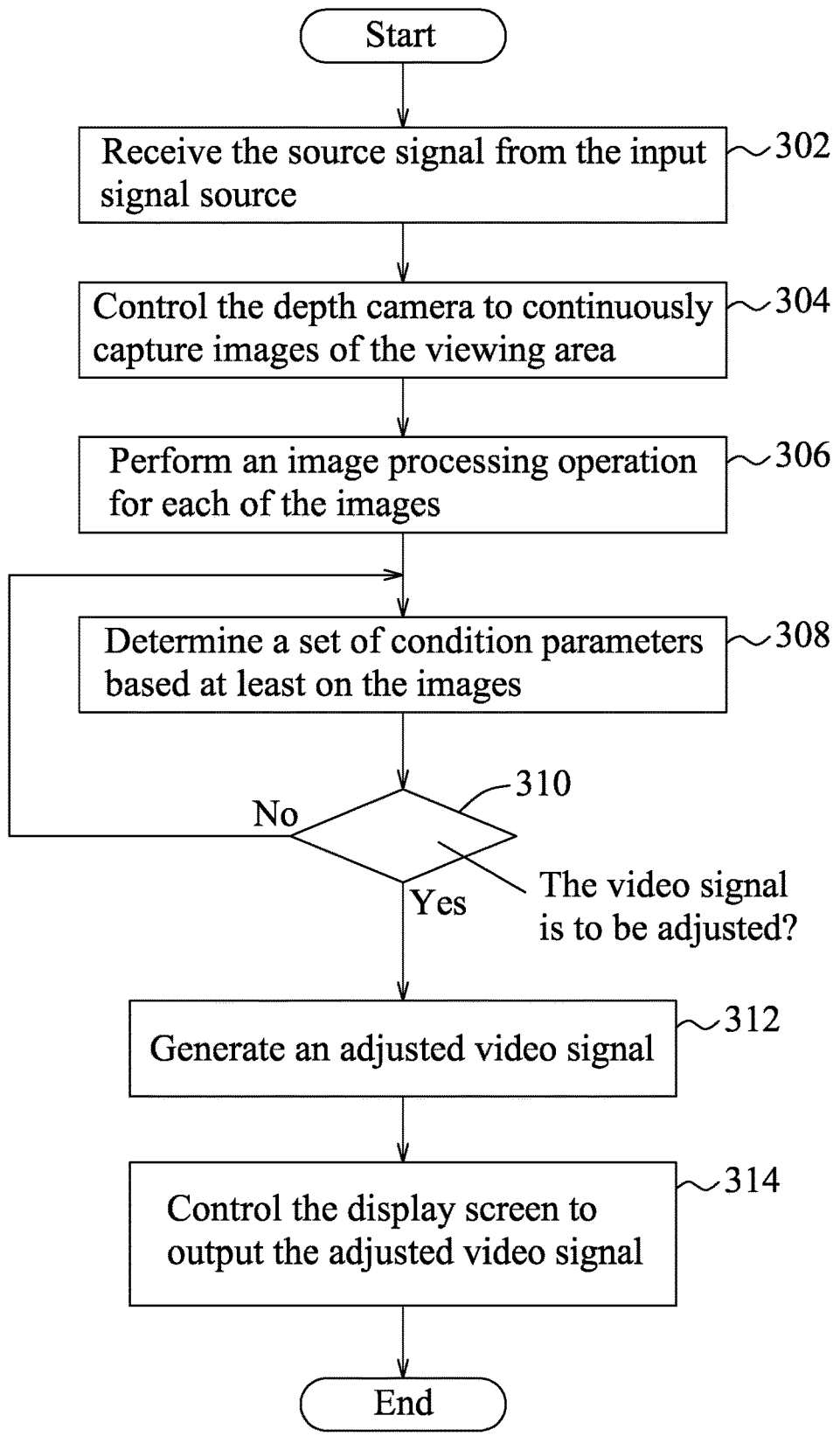
FIG. 3 is a flow chart illustrating steps of a method for automatically adjusting display parameters of a display screen of a television device according to one embodiment of the disclosure.

FIG. 3 is a flow chart illustrating steps of a method for automatically adjusting display parameters of a display screen of a television device according to one embodiment of the disclosure. The method may be implemented by the television device 100 as described with reference to FIGS. 1 and 2.

In use, in response to receipt of an activation signal (via, for example, the user operating a remote control or a control pad), the television device 100 may be powered on and start broadcasting a program.

In step 302, the television device 100 receives the source signal from the input signal source 200. In response to receipt of the source signal, the processor 110 controls the video/audio decoding unit 125 to perform the decoding operation on the source signal so as to obtain the video signal and the audio signal from the source signal. Then, the processor 110 controls the display screen 155 to display the video signal (i.e., visual content of the program) based on currently-set values respectively of the display parameters, and controls the audio output unit 160 to output the audio signal (i.e., audio content of the program).

In step 304, the processor 110 controls the depth camera 190 to continuously capture images of the viewing area in front of the display screen 155. It is noted that step 304 may be implemented when the user operates the remote control 180 or the control panel of the television device 100 to activate the depth camera 190. In some embodiments, the processor 110 automatically controls the depth camera 190 to capture images of the viewing area in front of the display screen 155 as the television device 100 is powered on.

Afterward, a user watching the program may operate the remote control 180 to enable the television device 100 to enter an eyecare mode. When the eyecare mode is activated, steps 306, 308, 310, 312 and 314 of the method of FIG. 3 may be implemented. In some embodiments, the processor 110 only controls the depth camera 190 to capture the images of the viewing area in the eyecare mode.

In some examples, the eyecare mode may be activated by default once the television device 100 is powered on. This setting of activation of the eyecare mode may be manually made by the user and stored by the processor 110 in the data storage 130 in advance.

In some examples, the eyecare mode is activated as the television device 100 is powered on, and step 304 is implemented simultaneously with step 302.

As the images are captured, the processor 110 performs, in step 306, an image processing operation for each of the images captured by the depth camera 190. Then, the processor 110 determines, in step 308, a set of condition parameters based at least on the images captured by the depth camera 190.

Specifically, the image processing operation may be implemented by the processor 110 executing a corresponding one of the software applications stored in the data storage 130. The corresponding software application may include one or more algorithms for performing the image processing operation on the images, so as to detect the user in the images (e.g., using an object detecting algorithm such as a machine learning framework or a deep learning neural network), and to calculate the distance between the user and the display screen 155.

In this embodiment, the set of condition parameters includes one or more of the ambient light intensity and the distance between the user and the display screen 155.

In some embodiments, the set of condition parameters may further include a genre of the program (that may be presented using a code), wherein the genre of the program is extracted by the processor 110 from the program metadata.

In some embodiments, the processor 110 further activates the timer 150 as soon as the user is detected in a current one of the images, and records an accumulated viewing time associated with the user. Specifically, after the timer 150 is activated, the processor 110 continuously performs the image processing operation for the images captured after the current one of the images. As long as the user is still detected the images, the processor 110 may "deduce" that the user is still watching the program being played on the television device 100, and as a result, the processor 11 is configured to leave the timer 150 running.

Specifically, the processor 110 may extract the genre of the program from the program metadata. Then, based on the genre of the program, the processor 110 may determine that one or more components of the video signal should be adjusted. In some cases, the processor 110 may acquire a channel number associated with a channel that is broadcasting the program watched by the user. Using the channel number, the processor 110 is able to "deduce" the genre of the program (for example, when the channel is a news channel, it may be deduced that the program is a news program).

In some embodiments, the processor 110 may further take the user setting included in the user profile stored in the data storage 130 into consideration in determining the condition parameters in step 308. For example, the user setting may include an age of the user, a sound preference of the user, a viewing preference of the user, etc.

It is noted that in various embodiments, the condition parameters determined by the processor 110 in step 308 may further include any combination of the parameters as described above. That is to say, in addition to the ambient light intensity, the condition parameters may further include one or more of the distance, the specific information regarding the program (such as a genre) that is being broadcasted, the user setting of the user profile, the accumulated viewing time, etc.

In step 310, the processor 110 determines, based on at least one condition parameter in the set of condition parameters, whether the video signal is to be adjusted.

In this embodiment, the processor 110 first determines an optimal setting that includes optimal values respectively of the display parameters based on the condition parameters determined in step 308, and compares the optimal values and the currently-set values that are currently used by the display screen 155 to display the video signal. The determination of the optimal setting may be implemented using a preset algorithm stored in the data storage 130.

For example, in the optimal setting, the optimal values respectively of the contrast, the brightness and the sharpness of the display parameters may be negatively related to the ambient light intensity. That is, when it is determined that the ambient light intensity is considered low (e.g., lower than a preset floor threshold), the processor 110 may determine that the ambient light intensity may be insufficient for the eyes of user. In such a case, for each of the contrast, the brightness and the sharpness of the display parameters, the optimal value is set to be relatively higher. After the optimal values are determined, the processor 110 may adjust the values of the contrast, the brightness and the sharpness of the display parameters to be equal respectively to the optimal values thereof, so as to enable the display screen 155 to display in a generally brighter manner for the user.

On the other hand, when it is determined that the ambient light intensity is considered high (e.g., higher than a preset cap threshold higher than the present floor threshold), the optimal values of the contrast, the brightness and the sharpness of the display parameters are set to be relatively lower. That is to say, when the ambient light intensity is sufficient for the user, the values of the contrast, the brightness and the sharpness should not be set "too high" so as not to adversely affect the eyes of the user. After the optimal values are determined, the processor 110 may adjust the values of the contrast, the brightness and the sharpness of the display parameters to be equal respectively to the optimal values thereof.

In another example, the optimal values of the brightness and the sharpness of the display parameters may be positively related to the distance between the user and the display screen 155.

In another example, the optimal value of a blue component of the RGB setting of the display parameters may be positively related to the ambient light intensity. For example, the optimal value of the blue component of the RGB setting may be adjusted to be lower in the nighttime (i.e., lower ambient light intensity) and to be higher in daylight (i.e., higher ambient light intensity).

In another example, the optimal value of the color temperature of the display parameters may be positively related to the ambient light intensity. For example, the optimal vale of the color temperature of the display parameters may be adjusted to be lower in the nighttime (e.g., 3000 to 4000 kelvin) to have a "warmer" look, and higher in daylight (e.g., 5000 to 6000 kelvin) to have a "cooler" look.

In short, the display parameters may be adjusted to achieve a desired luminance, which refers to a luminance within a desired range of luminance of the video signal. Based on the distance between the user and the display screen 155 and based on the ambient light intensity, a luminance within the desired range of luminance of the video signal may be appropriate to be displayed by the display screen 155 for the user. In this embodiment, the desired luminance is calculated in a unit of Nit. In order to achieve a specific desired luminance, some of the display parameters (e.g., the brightness, the sharpness, the contrast, etc.) may be adjusted.

The following Table 1 illustrates some exemplary desired luminances based on the distance between the user and the display screen 155, and the ambient light intensity.

TABLE 1

| Distance (meters) | Ambient Light Intensity | Color Temperature (Kelvin) | Desired Range of Luminance (Nit) |
|---|---|---|---|
| less than 2 | less than 150 | 3000 to 6000 | 20 to 100 |
|  | 150 to 225 | 4000 to 7000 | 20 to 120 |
|  | 225 to 255 | 8000 to 8000 | 20 to 140 |
| 2 to 4 | less than 150 | 3000 to 6500 | 30 to 120 |
|  | 150 to 225 | 4000 to 7500 | 30 to 150 |
|  | 225 to 255 | 5000 to 8500 | 30 to 180 |
| 4 or above | less than 150 | 4000 to 7000 | 40 to 150 |
|  | 150 to 225 | 5000 to 8000 | 40 to 190 |
|  | 225 to 255 | 6000 to 9000 | 40 to 230 |

It is noted that ambient light intensity used in Table 1 is measured in a scale of 1 to 255, and the ambient light intensity of 255 indicates a light intensity of above 10000 lux.

It is noted that in determining whether to adjust the video signal, the processor 110 may also take additional aspects into consideration when calculating the optimal values. For example, the viewing preference of the user may indicate how one or more of the display parameters should be adjusted (e.g., the user may prefer to watch television with a brighter display screen, or a higher color contrast, etc.).

In some embodiments, when it is determined that the accumulated viewing time has reached a predetermined viewing time threshold (e.g., 30 minutes), the processor 110 may adjust the value(s) of one or more of the display parameters.

In some examples, when the user setting indicates that the user watching the program is at an advanced age (e.g., older than 65 years), the optimal values of the brightness and contrast of the display parameters may be set higher. Furthermore, the processor 110 may access the viewing preference of the user profile stored in the data storage 130, and determine whether the video signal needs to be adjusted further based on the viewing preference (e.g., the viewing preference may indicate that the user intends to watch to the video signal more clearly).

When it is determined that the video signal needs to be adjusted, the flow proceeds to step 312. Otherwise, the flow goes back to step 308. In this embodiment, when the currently-set value of one of the display parameters used by the display screen 155 is different from the corresponding calculated optimal value, the processor 110 determines that the video signal needs to be adjusted.

In step 312, the processor 110 adjusts the video signal by adjusting at least one of the display parameters, so as to generate an adjusted video signal. In this embodiment, the processor 110 adjusts the display parameters used by the display screen 155 to be identical to the optimal values.

In step 314, the processor 110 controls the display screen 155 to output the adjusted video signal. In such a manner, the video signal may be adjusted so as to provide a more comfortable viewing experience for the user.

It is noted that, in some embodiments, after step 312 is implemented for a predetermined time period (e.g., 5 minutes), the flow may go back to step 308 to determine whether the set of condition parameters has changed, and to determine whether the video signal should be adjusted accordingly.

In some embodiments, when it is determined that no user is detected in the images (i.e., the user has left the viewing area) while in the eyecare mode, the processor 11 may switch back to a default mode, and controls the display screen 155 to display the video signal as is, i.e., the video signal that has not been adjusted.

To sum up, the embodiments of the disclosure provide a method and a television system that, when in the eyecard mode, are configured to automatically adjust output of a video signal based on aspects related to the viewing area such as the ambient light intensity, the distance between a user and the display screen 155, etc. In embodiments, based on various additional aspects, the video signal may be further adjusted to provide an even better experience for the user watching the program broadcasted by the television system or playing a video game using the television system.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for automatically adjusting display parameters of a display screen of a television device, the television device further including a processor that communicates with a depth camera, the method being implemented using the processor of the television device and comprising steps of:

in receipt of an activation signal, controlling the display screen to output a video signal based on a set of display parameters;

controlling the depth camera to continuously capture images of a viewing area in front of the display screen;

determining a set of condition parameters based at least on the images;

determining, based on at least one condition parameter in the set of condition parameters, whether the video signal is to be adjusted; and when it is determined that the video signal is to be adjusted, adjusting at least one display parameter in the set of display parameters to generate an adjusted video signal and controlling the display screen to output the adjusted video signal;

wherein the step of determining the set of condition parameters includes performing, for each of the images captured by the depth camera, an image processing operation to obtain an ambient light intensity, and a distance between a user and the display screen, the ambient light intensity and the distance being included in the set of condition parameters;

the television device further including a program monitoring unit that is connected to an input signal source for receiving program metadata therefrom, wherein the set of condition parameters further includes a genre of a program extracted from the program metadata.

2. The method of claim 1, the television device further including a timer, wherein the set of the condition parameters further includes an accumulated viewing time that is recorded by the timer and that is associated with the user.

3. The method of claim 1, the television device further including a data storage storing a user profile, the method comprising accessing a viewing preference of the user profile stored in the data storage;

wherein determining whether the video signal is to be adjusted is implemented further based on the viewing preference.

4. The method of claim 1, wherein the set of display parameters includes at least one of contrast, red, green and blue setting, luminance of the display screen, brightness, sharpness and color temperature.

5. The method of claim 1, wherein determining whether the video signal is to be adjusted includes:

based on the set of the condition parameters, calculating an optimal setting that includes optimal values respectively of the display parameters;

comparing the optimal values of the optimal setting and currently-set values of the display parameters that are currently used by the display screen to display the video signal; and adjusting values of the display parameters based on a result of the comparing of the optimal values and of the currently-set values.

6. A television device that is connected to a depth camera and that includes a processor and a display screen, wherein said processor is configured to:

in receipt of an activation signal, control said display screen to output a video signal based on a set of display parameters, and control the depth camera to continuously capture images of a viewing area in front of said display screen;

determine a set of condition parameters by performing, for each of the images captured by the depth camera, an image processing operation;

determine, based on at least one of the condition parameters, whether the video signal is to be adjusted; and when it is determined that the video signal is to be adjusted, adjust at least one display parameter in the set of display parameters and control said display screen to output the video signal based on an adjusted set of display parameters that includes said at least one display parameter that has been adjusted;

wherein the set of condition parameters determined by said processor includes one or more of the following:
an ambient light intensity; and
a distance between a user and said display screen;

wherein the television device further comprises a program monitoring unit that is connected to an input signal source for receiving program metadata therefrom, and the set of condition parameters determined by said processor further includes a genre of a program extracted from the program metadata.

7. The television device of claim 6, further comprising a timer, wherein the set of condition parameters determined by said processor further includes an accumulated time of viewing associated with the user.

8. The television device of claim 6, further comprising a data storage storing a user profile, wherein:

said processor determines whether the video signal is to be adjusted by accessing a viewing preference of the user profile stored in said data storage, and determines whether the video signal is to be adjusted further based on the viewing preference.

9. The television device of claim 6, wherein the set of display parameters includes at least one of contrast, red, green and blue setting, luminance of the display screen, brightness, sharpness and color temperature.

10. The television device of claim 6, wherein said processor is programmed to determine whether the video signal is to be adjusted by:

based on the set of the condition parameters, calculating an optimal setting that includes optimal values respectively of the display parameters;

comparing the optimal values of the optimal setting and currently-set values of the display parameters; and adjusting values of the display parameters based on a result of the comparing of the optimal values of the optimal setting and the currently-set values of the display parameters.

* * * * *